(12) United States Patent
Seo et al.

(10) Patent No.: US 8,517,886 B2
(45) Date of Patent: Aug. 27, 2013

(54) PLANETARY GEAR TRAIN OF AUTOMATIC TRANSMISSION FOR VEHICLES

(75) Inventors: Kangsoo Seo, Suwon-si (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/316,225

(22) Filed: Dec. 9, 2011

(65) Prior Publication Data

US 2012/0302393 A1 Nov. 29, 2012

(30) Foreign Application Priority Data

May 27, 2011 (KR) .......................... 10-2011-0050585

(51) Int. Cl.
*F16H 3/44* (2006.01)
(52) U.S. Cl.
USPC .......................................................... 475/288
(58) Field of Classification Search
USPC ........................... 475/271, 275–291, 296, 330
See application file for complete search history.

(56) References Cited

U.S. PATENT DOCUMENTS

| 3,971,268 | A | 7/1976 | Murakami et al. | |
|---|---|---|---|---|
| 4,228,697 | A | 10/1980 | Miller | |
| 6,176,803 | B1 | 1/2001 | Meyer et al. | |
| 6,752,738 | B1 * | 6/2004 | Martin et al. | 475/276 |
| 7,736,262 | B2 | 6/2010 | Suh | |
| 2007/0072732 | A1 | 3/2007 | Klemen | |
| 2007/0129206 | A1 * | 6/2007 | Jang | 475/275 |
| 2007/0225109 | A1 * | 9/2007 | Jang | 475/280 |
| 2008/0039266 | A1 | 2/2008 | Shim | |
| 2008/0113844 | A1 | 5/2008 | Baldwin | |
| 2008/0188344 | A1 | 8/2008 | Raghavan et al. | |
| 2008/0207382 | A1 * | 8/2008 | Kato et al. | 475/276 |
| 2008/0207383 | A1 * | 8/2008 | Kato et al. | 475/276 |
| 2009/0118058 | A1 * | 5/2009 | Suh | 475/275 |
| 2010/0331138 | A1 | 12/2010 | Phillips | |
| 2011/0045942 | A1 | 2/2011 | Gumpoltsberger et al. | |
| 2012/0178581 | A1 * | 7/2012 | Wittkopp et al. | 475/275 |

FOREIGN PATENT DOCUMENTS

| JP | 2006-349153 A | 12/2006 |
|---|---|---|
| KR | 1020080033789 A | 4/2008 |
| KR | 10-0963712 B1 | 6/2010 |

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A planetary gear train of an automatic transmission may include an input shaft; an output gear; a first compound planetary gear set having four rotation elements by combining first and second planetary gear sets; a second compound planetary gear set having four rotation elements by combing third and fourth planetary gear sets; eight rotational members including two rotation elements connected to each other or one rotation element among the rotation elements of the first and second compound planetary gear sets; and seven friction members including three clutches interposed between a selected rotational member among the rotational members and the input shaft and adapted to selectively transmit the torque and four brakes interposed between a rotational member among the rotational members and a transmission housing.

14 Claims, 4 Drawing Sheets

FIG. 2

|     | C1 | C2 | C3 | B1 | B2 | B3 | B4 | GEAR RATIO |
|-----|----|----|----|----|----|----|----|------------|
| D1  | ●  |    |    |    | ●  | ●  |    | 4.87       |
| D2  |    | ●  |    |    | ●  | ●  |    | 2.94       |
| D3  | ●  | ●  |    |    |    | ●  |    | 2.16       |
| D4  |    | ●  |    |    |    | ●  | ●  | 1.54       |
| D5  |    | ●  | ●  |    |    | ●  |    | 1.33       |
| D6  |    | ●  | ●  |    |    |    | ●  | 1.19       |
| D7  | ●  | ●  | ●  |    |    |    |    | 1.00       |
| D8  |    | ●  | ●  |    | ●  |    |    | 0.90       |
| D9  | ●  |    | ●  |    | ●  |    |    | 0.81       |
| D10 |    |    | ●  | ●  | ●  |    |    | 0.71       |
| D11 | ●  |    |    | ●  |    |    |    | 0.64       |
| REV | ●  |    |    | ●  |    | ●  |    | -5.41      |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2011-0050585 filed in the Korean Intellectual Property Office on May 27, 2011, the entire contents of which is incorporated herein for all purposes by this reference.

BACKGROUND OF THE INVENTION

1. Field of the Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and twelfth-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a planetary gear train of an automatic transmission for vehicles having advantages of achieving eleven forward speeds and a reverse speed by combining a plurality of planetary gear sets with a plurality of friction members and reducing drag loss by reducing the number of friction members which are not operated at each shift-speed.

A planetary gear train of an automatic transmission for vehicles in various aspects of the present invention may include an input shaft adapted to receive engine torque, an output gear adapted to output a shifted torque, a first compound planetary gear set having four rotation elements by combining first and second planetary gear sets and adapted to primarily shift torque input through two input paths into six speed ratio and to output the primarily shifted torque, a second compound planetary gear set having four rotation elements by combing third and fourth planetary gear sets and adapted to secondarily shift the torque input from the first compound planetary gear set and the torque input from the input shaft through one path into multiple shift-speeds and to output the multiple shift-speeds, eight rotational members including two rotation elements connected to each other or one rotation element among the rotation elements of the first and second compound planetary gear sets, and seven friction members including three clutches interposed between a selected rotational member among the rotational members and the input shaft and adapted to selectively transmit the torque and four brakes interposed between a rotational member among the rotational members and a transmission housing.

In addition, the first compound planetary gear set may include the first planetary gear set being a single pinion planetary gear set having a first sun gear, a first planet carrier, and a first ring gear, the second planetary gear set being a single pinion planetary gear set having a second sun gear, a second planet carrier, and a second ring gear, a first rotational member including the first sun gear and adapted to be connected to the transmission housing selectively, a second rotational member including the first planet carrier and the second ring gear, a third rotational member including the first ring gear and the second planet carrier, and adapted to be selectively connected to the input shaft or to the transmission housing, a fourth rotational member including the second sun gear and adapted to be selectively connected to the input shaft or to the transmission housing, a first clutch interposed between the input shaft and the fourth rotational member, a second clutch interposed between the input shaft and the third rotational member, a first brake interposed between the third rotational member and the transmission housing, a second brake interposed between the first rotational member and the transmission housing, and a fourth brake interposed between the fourth rotational member and the transmission housing.

The second compound planetary gear set may include the third planetary gear set being a single pinion planetary gear set having a third sun gear, a third planet carrier, and a third ring gear, the fourth planetary gear set being a single pinion planetary gear set having a fourth sun gear, a fourth planet carrier, and a fourth ring gear, a fifth rotational member including the fourth sun gear and adapted to be directly connected to the first planet carrier and the second ring gear of the first compound planetary gear set, a sixth rotational member including the third ring gear and the fourth planet carrier and adapted to be selectively connected to the input shaft, a seventh rotational member including the third planet carrier and the fourth ring gear and adapted to be directly connected to the output gear, an eighth rotational member including the third sun gear and adapted to be selectively connected to the transmission housing, a third clutch interposed between the input shaft and the sixth rotational member, a third brake interposed between the eighth rotational member and the transmission housing.

In addition, the multiple shift-speeds may include a first forward speed achieved by operating the first clutch, the second brake, and the third brake, a second forward speed achieved by operating the second clutch, the second brake, and the third brake, a third forward speed achieved by operating the first clutch, the second clutch, and the third brake, a fourth forward speed achieved by operating the second clutch, the third brake, and the fourth brake, a fifth forward speed achieved by operating the second clutch, the third clutch, and the third brake, a sixth forward speed achieved by operating the second clutch, the third clutch, and the fourth brake, a seventh forward speed achieved by operating the first clutch, the second clutch, and the third clutch, an eighth forward speed achieved by operating the second clutch, the third clutch, and the second brake, a ninth forward speed achieved by operating the first clutch, the third clutch, and the second brake, a tenth forward speed achieved by operating the third clutch, the first brake, and the second brake, an eleventh forward speed achieved by operating the first clutch, the third clutch, and the first brake, and a reverse speed achieved by operating the first clutch, the first brake, and the third brake.

In another aspect of the present invention, the first compound planetary gear set is a compound planetary gear set of Ravingneaux type formed by combining the first planetary gear set being a double pinion planetary gear set and the second planetary gear set being a single pinion planetary gear set and by sharing a ring gear and a planet carrier in common, and may include a first sun gear engaged with a short pinion, a second sun gear engaged with a long pinion, a common planet carrier, and a common ring gear. The first compound planetary gear set may include a first rotational member including the first sun gear and adapted to be selectively connected to the transmission housing, a second rotational member including the common ring gear, a third rotational member including the common planet carrier and adapted to be selectively connected to the input shaft or to the transmission housing, a fourth rotational member including the second sun gear and adapted to be selectively connected to the input shaft or to the transmission housing, a first clutch interposed between the input shaft and the fourth rotational member, a second clutch interposed between the input shaft and the third rotational member, a first brake interposed between the third rotational member and the transmission housing, a second brake interposed between the first rotational member and the transmission housing, and a fourth brake interposed between the fourth rotational member and the transmission housing.

In addition, the second compound planetary gear set may include the third planetary gear set being a single pinion planetary gear set having a third sun gear, a third planet carrier, and a third ring gear, the fourth planetary gear set being a single pinion planetary gear set having a fourth sun gear, a fourth planet carrier, and a fourth ring gear, a fifth rotational member including the third ring gear and adapted to be directly connected to the common ring gear of the first compound planetary gear set, a sixth rotational member including the third planet carrier and the fourth ring gear and adapted to be selectively connected to the input shaft, a seventh rotational member including the fourth planet carrier and adapted to be directly connected to the output gear, an eighth rotational member including the third sun gear and the fourth sun gear and adapted to be selectively connected to the transmission housing, a third clutch interposed between the input shaft and the sixth rotational member, and a third brake interposed between the eighth rotational member and the transmission housing.

In addition, a one-way clutch disposed in parallel with the third brake is may further include d.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to a planetary gear train according to the various exemplary embodiments of the present invention.

Figure 1:
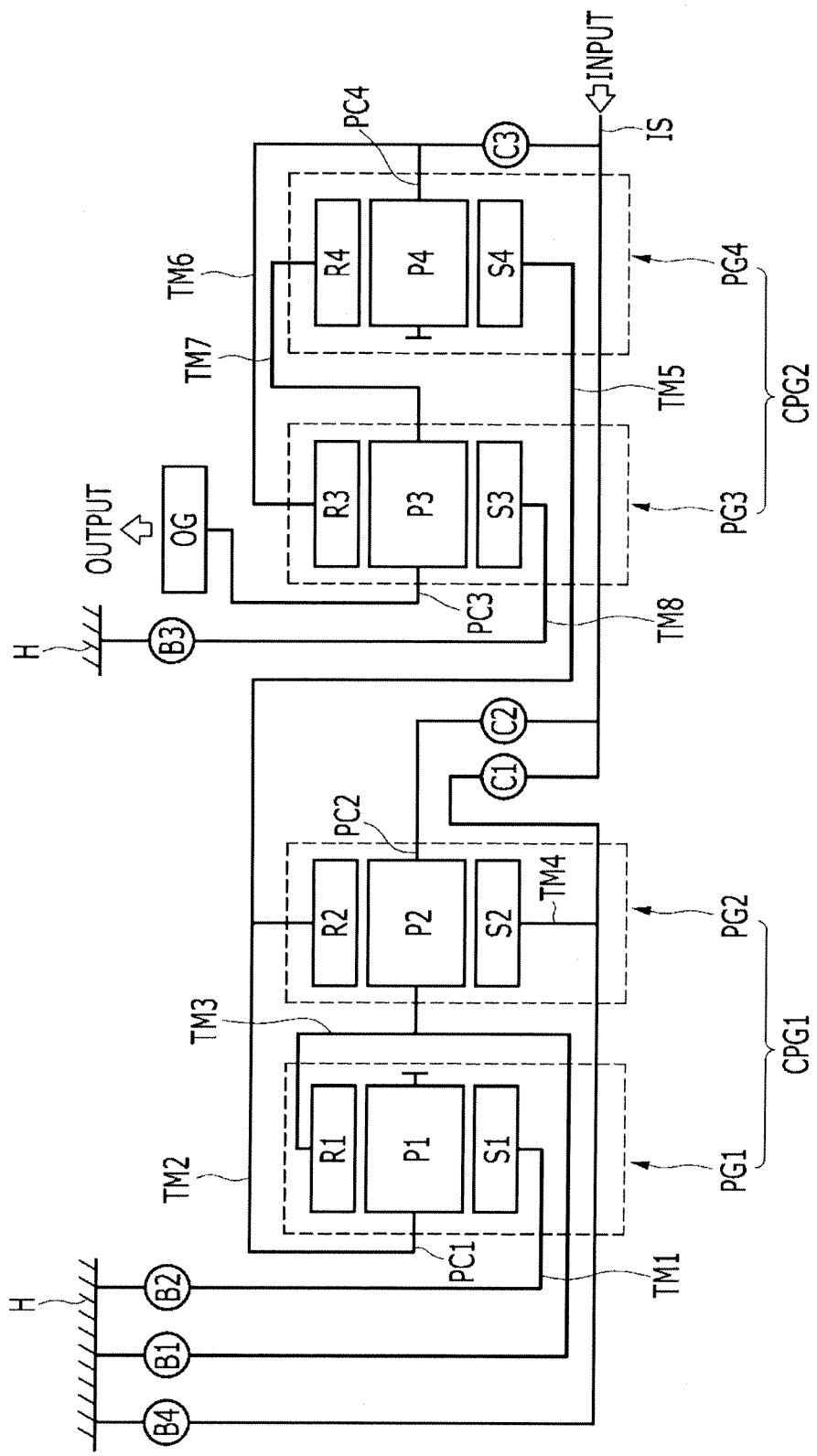
FIG. 1 is a schematic diagram of a planetary gear train according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to the first exemplary embodiment of the present invention.

Referring to FIG. 1, a planetary gear train according to the first exemplary embodiment of the present invention includes first, second, third, and fourth planetary gear sets PG1, PG2, PG3, and PG4 disposed on the same axis, an input shaft IS, an output gear OG, eight rotational members TM1-TM8 directly or selectively connecting rotation elements of the first, second, third, and fourth planetary gear sets PG1, PG2, PG3, and PG4, seven friction members C1-C3 and B1-B4, and a transmission housing H.

A rotation speed input from the input shaft IS is changed by the first, second, third, and fourth planetary gear sets PG1, PG2, PG3, and PG4 and is output through the output gear OG.

In addition, the simple planetary gear sets are disposed in a sequence of the first, second, third, and fourth planetary gear sets PG1, PG2, PG3, and PG4 from the rear to an engine.

The input shaft IS is an input member, and torque from a crankshaft of the engine is changed through a torque converter and is input to the input shaft IS.

The output gear OG is an output member and delivers driving torque so as to run driving wheels through a differential apparatus.

The first planetary gear set PG1 is a single pinion planetary gear set and includes a first sun gear S1, a first planet carrier PC1 rotatably supporting a first pinion P1 externally engaged with the first sun gear S1, and a first ring gear R1 internally engaged with the first pinion P1 as rotation elements thereof.

The second planetary gear set PG2 is a single pinion planetary gear set and includes a second sun gear S2, a second planet carrier PC2 rotatably supporting a second pinion P2 externally engaged with the second sun gear S2, and a second ring gear R2 internally engaged with the second pinion P2 as rotation elements thereof.

The third planetary gear set PG3 is a single pinion planetary gear set and includes a third sun gear S3, a third planet carrier PC3 rotatably supporting a third pinion P3 externally engaged with the third sun gear S3, and a third ring gear R3 internally engaged with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 externally engaged with the fourth sun gear S4, and a fourth ring gear R4 internally engaged with the fourth pinion P4 as rotation elements thereof.

In addition, the first, second, third, and fourth simple planetary gear sets PG1, PG2, PG3, and PG4 form two compound planetary gear sets CPG1 and CPG2, change the torque transmitted from the input shaft into eleven forward speeds, and output the eleven forward speeds.

The first compound planetary gear set CPG1 includes the first and second planetary gear sets PG1 and PG2, and the second compound planetary gear set CPG2 includes the third and fourth planetary gear sets PG3 and PG4.

That is, the first compound planetary gear set CPG1 is operated by four rotation elements by directly connecting the first planet carrier PC1 with the second ring gear R2 and directly connecting the first ring gear R1 with the second planet carrier PC2, and includes first, second, third, and fourth rotational members TM1, TM2, TM3, and TM4.

In addition, the second compound planetary gear set CPG2 is operated by four rotation elements by directly connecting the third planet carrier PC3 with the fourth ring gear R4 and directly connecting the third ring gear R3 with the fourth planet carrier PC4, and includes fifth, sixth, seventh, and eighth rotational members TM5, TM6, TM7, and TM8.

Accordingly, the planetary gear train according to the present exemplary embodiment includes eight rotational members TM1-TM8.

The first rotational member TM1 includes the first sun gear S1 and is selectively connected to the transmission housing H.

The second rotational member TM2 includes the first planet carrier PC1 and the second ring gear R2.

The third rotational member TM3 includes the first ring gear R1 and the second planet carrier PC2, and is selectively connected to the input shaft IS or the transmission housing H.

The fourth rotational member TM4 includes the second sun gear S2, and is selectively connected to the input shaft IS or to the transmission housing H.

The fifth rotational member TM5 includes the fourth sun gear S4 and is directly connected to the second rotational member TM2.

The sixth rotational member TM6 includes the third ring gear R3 and the fourth planet carrier PC4 and is selectively connected to the input shaft IS.

The seventh rotational member TM7 includes the third planet carrier PC3 and the fourth ring gear S4 and is connected to the output gear OG.

The eighth rotational member TM8 includes the third sun gear S3 and is selectively connected to the transmission housing H.

In addition, the third, fourth, and sixth rotational members TM3, TM4, and TM6 among the rotational members TM1-TM8 selectively connected to the input shaft IS and operated as selective input elements are connected to the input shaft IS respectively through the clutches C2, C1, and C3.

In addition, the first, third, fourth, and eighth rotational members TM1, TM3, TM4, and TM8 among the rotational members TM1-TM8 selectively connected to the transmission housing H and operated as selective fixed elements are connected to the transmission housing H respectively through the brakes B2, B1, B4, and B3.

That is, the first clutch C1 is interposed between the input shaft IS and the fourth rotational member TM4, and operates the fourth rotational member TM4 as the selective input element.

The second clutch C2 is interposed between the input shaft IS and the third rotational member TM3, and operates the third rotational member TM3 as the selective input element.

The third clutch C3 is interposed between the input shaft IS and the sixth rotational member TM6, and operates the sixth rotational member TM6 as the selective input element.

The first brake B1 is interposed between the third rotational member TM3 and the transmission housing H, and operates the third rotational member TM3 as the selective fixed element.

The second brake B2 is interposed between the first rotational member TM1 and the transmission housing H, and operates the first rotational member TM1 as the selective fixed element.

The third brake B3 is interposed between the eighth rotational member TM8 and the transmission housing H, and operates the eighth rotational member TM8 as the selective fixed element.

The fourth brake B4 is interposed between the fourth rotational member TM4 and the transmission housing H, and operates the fourth rotational member TM4 as the selective fixed element.

The first and second clutches C1 and C2 and the first, second, and fourth brakes B1, B2, and B4 are applied to the first compound planetary gear set CPG1, and torque input through the first and second clutches C1 and C2 is changed into six speed ratios according to operations of the first, second, and fourth brakes B1, B2, and B4.

In addition, the third clutch C3 and the third brake B3 are applied to the second compound planetary gear set CPG2, and the torque input from the input shaft IS through the third clutch C3 and the torque changed into the six speed ratios and input from the first compound planetary gear set CPG1 are changed into eleven forward speeds and one reverse speed by operation of the third brake B3.

Friction members including the first, second, and third clutches C1, C2, and C3 and the first, second, third, and fourth brakes B1, B2, B3, and B4 are conventional multi-plate friction elements of wet type that are operated by hydraulic pressure.

FIG. 2 is an operational chart of friction members at each shift-speed applied to a planetary gear train according to the first exemplary embodiment of the present invention.

As shown in FIG. 2, three friction members are operated at each shift-speed to according the first exemplary embodiment of the present invention.

The first clutch C1, the second brake B2, and the third brake B3 are operated at a first forward speed D1.

The second clutch C2, the second brake B2, and the third brake B3 are operated at a second forward speed D2.

The first clutch C1, the second clutch C2, and the third brake B3 are operated at a third forward speed D3.

The second clutch C2, the third brake B3, and the fourth brake B4 are operated at a fourth forward speed D4.

The second clutch C2, the third clutch C3, and the third brake B3 are operated at a fifth forward speed D5.

The second clutch C2, the third clutch C3, and the fourth brake B4 are operated at a sixth forward speed D6.

The first clutch C1, the second clutch C2, and the third clutch C3 are operated at a seventh forward speed D7.

The second clutch C2, the third clutch C3, and the second brake B2 are operated at an eighth forward speed D8.

The first clutch C1, the third clutch C3, and the second brake B2 are operated at a ninth forward speed D9.

The third clutch C3, the first brake B1, and the second brake B2 are operated at a tenth forward speed D10.

The first clutch C1, the third clutch C3, and the first brake B1 are operated at an eleventh forward speed D11.

The first clutch C1, the first brake B1, and the third brake B3 are operated at a reverse speed REV.

Figure 3:
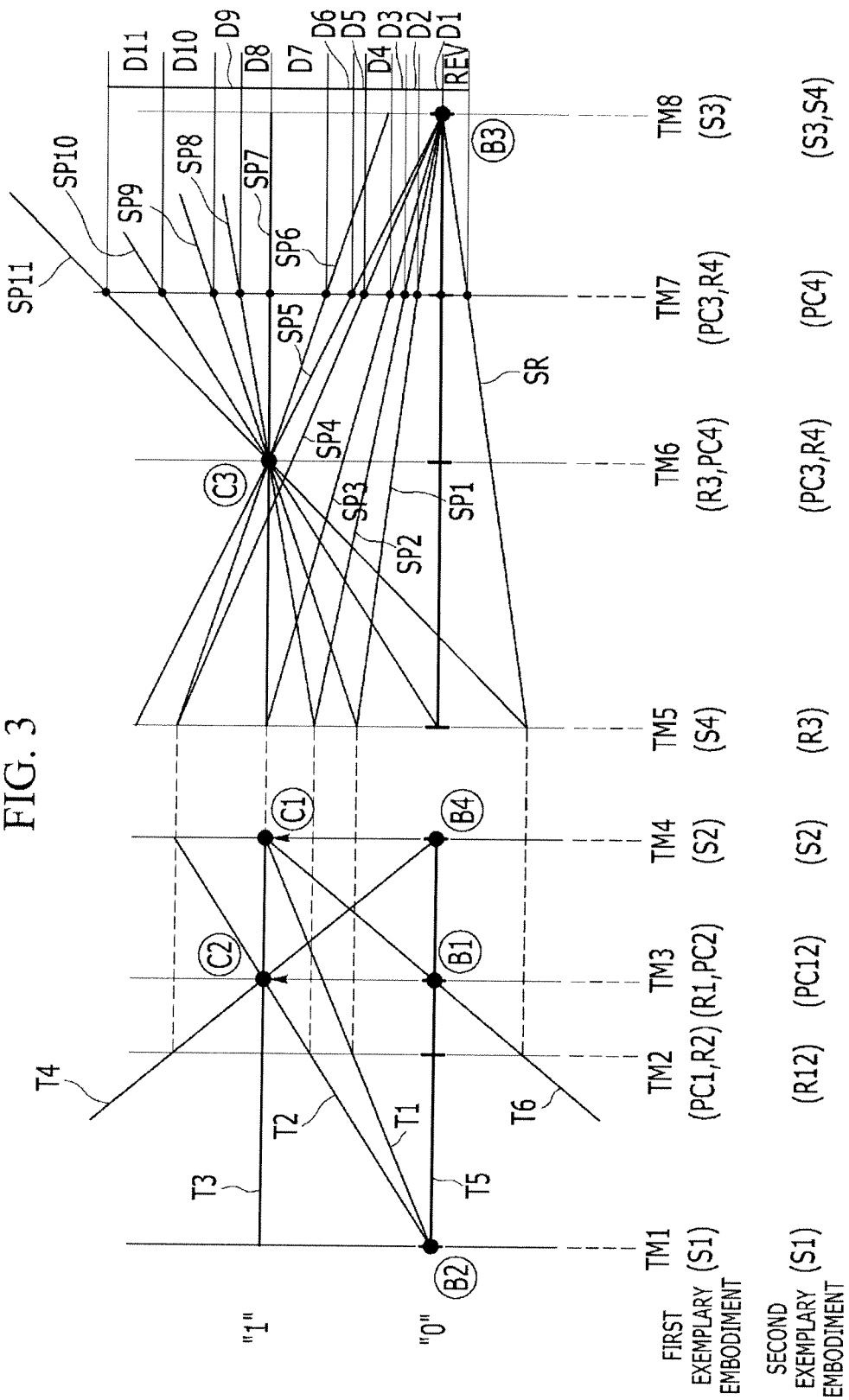
FIG. 3 is a lever diagram for a planetary gear train according to the various exemplary embodiments of the present invention.

FIG. 3 is a lever diagram for a planetary gear train according to the first exemplary embodiment of the present invention.

Referring to FIG. 3, a lower horizontal line represents a rotation speed is "0", and an upper horizontal line represents a rotation speed is "1.0", that is the rotation speed thereof is the same as that of the input shaft IS.

Four vertical lines of the first compound planetary gear set CPG1 sequentially represent the first, second, third, and fourth rotational members TM1, TM2, TM3, and TM4 from the left to the right.

Herein, distances between the first, second, third, and fourth rotational members TM1, TM2, TM3, and TM4 are set according to gear ratios (teeth number of the sun gear/teeth number of the ring gear) of the first and second simple planetary gear sets PG1 and PG2.

Four vertical lines of the second compound planetary gear set CPG2 sequentially represent the fifth, sixth, seventh, and eighth rotational members TM5, TM6, TM7, and TM8 from the left to the right.

Herein, distances between the fifth, sixth, seventh, and eighth rotational members TM5, TM6, TM7, and TM8 are set according to gear ratios (teeth number of the sun gear/teeth number of the ring gear) of the third and fourth simple planetary gear sets PG3 and PG4.

At this time, the second rotational member TM2 and the fifth rotational member TM5 are directly connected to each other and are operated as one rotational member. However, for convenience of explanation, the second rotational member TM2 and the fifth rotational member TM5 are divided.

Referring to FIG. 2 and FIG. 3, shifting processes for each shift-speed in the planetary gear train according to the first exemplary embodiment will be described.

[First Forward Speed]

Referring to FIG. 2, the first clutch C1 and the second and third brakes B2 and B3 are operated at the first forward speed D1.

As shown in FIG. 3, in a state that the rotation speed of the input shaft IS is input to the fourth rotational member TM4 by operation of the first clutch C1, the first rotational member TM1 is operated as the fixed element by operation of the second brake B2 in the first compound planetary gear set CPG1.

Therefore, the first compound planetary gear set CPG1 forms a first reduced speed line T1 and outputs a first reduced speed through the second rotational member TM2.

In a state that the first reduced speed is input to the fifth rotational member TM5 directly connected to the second rotational member TM2, the eighth rotational member TM8 is operated as the fixed element by operation of the third brake B3. Therefore, the second compound planetary gear set CPG2 forms a first shift line SP1.

The first shift line SP1 crosses the vertical line of the seventh rotational member TM7 that is the output element such that the first forward speed D1 is output.

[Second Forward Speed]

The first clutch C1 that was operated at the first forward speed D1 is released and the second clutch C2 is operated at the second forward speed D2.

In a state that the rotation speed of the input shaft IS is input to the third rotational member TM3 by operation of the second clutch C2, the first rotational member TM1 is operated as the fixed element by operation of the second brake B2 in the first compound planetary gear set CPG1.

Accordingly, the first compound planetary gear set CPG1 forms a second reduced speed line T2 and a second reduced speed is output through the second rotational member TM2.

In addition, in a state that the second reduced speed is input to the fifth rotational member TM5 directly connected to the second rotational member TM2, the eighth rotational member TM8 is operated as the fixed element by operation of the third brake B3. Therefore, the second compound planetary gear set CPG2 forms a second shift line SP2.

The second shift line SP2 crosses the vertical line of the seventh rotational member TM7 that is the output element such that the second forward speed D2 is output.

[Third Forward Speed]

The second brake B2 that was operated at the second forward speed D2 is released and the first clutch C1 is operated at the third forward speed D3.

The first and second clutches C1 and C2 are operated simultaneously such that the rotation speed of the input shaft IS is input simultaneously to the third and fourth rotational members TM3 and TM4. Therefore, the first compound planetary gear set CPG1 becomes a direct-coupling state. Therefore, the first compound planetary gear set CPG1 forms a direct-coupling speed line T3 and outputs the rotation speed of the input shaft IS through the second rotational member TM2.

In a state that the rotation speed of the input shaft IS is input through the fifth rotational member TM5 directly connected to the second rotational member TM2, the eighth rotational member TM8 is operated as the fixed element by operation of the third brake B3. Therefore, the second compound planetary gear set CPG2 forms a third shift line SP3.

The third shift line SP3 crosses the vertical line of the seventh rotational member TM7 that is the output element such that the third forward speed D3 is output.

[Fourth Forward Speed]

The first clutch C1 that was operated at the third forward speed D3 is released and the fourth brake B4 is operated at the fourth forward speed D4.

In a state that the rotation speed of the input shaft IS is input to the third rotational member TM3 by operation of the second clutch C2, the fourth rotational member TM4 is operated as the fixed element by operation of the fourth brake B4 in the first compound planetary gear set CPG1.

Accordingly, the first compound planetary gear set CPG1 forms an increased speed line T4 and outputs an increased speed through the second rotational member TM2.

In a state that the increased speed is input to the fifth rotational member TM5 directly connected to the second rotational member TM2, the eighth rotational member TM8 is operated as the fixed element by operation of the third brake B3. Therefore, the second compound planetary gear set CPG2 forms a fourth shift line SP4.

The fourth shift line SP4 crosses the vertical line of the seventh rotational member TM7 that is the output element such that the fourth forward speed D4 is output.

[Fifth Forward Speed]

The fourth brake B4 that was operated at the fourth forward speed D4 is released and the third clutch C3 is operated at the fifth forward speed D5.

The rotation speed of the input shaft IS is input to the third rotational member TM3 by operation of the second clutch C2, but the first compound planetary gear set CPG1 does not have any effect on shifting since there is no fixed element.

In a state that the rotation speed of the input shaft IS is input to the sixth rotational member TM6 by operation of the third clutch C3, the eighth rotational member TM8 is operated as the fixed element by operation of the third brake B3. Therefore, the second compound planetary gear set CPG2 forms a fifth shift line SP5.

The fifth shift line SP5 crosses the vertical line of the seventh rotational member TM7 that is the output element such that the fifth forward speed D5 is output.

[Sixth Forward Speed]

The third brake B3 that was operated at the fifth forward speed D5 is released and the fourth brake B4 is operated at the sixth forward speed D6.

In a state that the rotation speed of the input shaft IS is input to the third rotational member TM3 by operation of the second clutch C2, the fourth rotational member TM4 is operated as the fixed element by operation of the fourth brake B4 in the first compound planetary gear set CPG1.

Accordingly, the first compound planetary gear set CPG1 forms the increased speed line T4 and outputs the increased speed through the second rotational member TM2.

In a state that the increased speed is input to the fifth rotational member TM5 directly connected to the second rotational member TM2, the rotation speed of the input shaft IS is input to the sixth rotational member TM6 by operation of the third clutch C3 in the second compound planetary gear set CPG2. Therefore, the second compound planetary gear set CPG2 forms a sixth shift line SP6.

The sixth shift line SP6 crosses the vertical line of the seventh rotational member TM7 that is the output element such that the sixth forward speed D6 is output.

[Seventh Forward Speed]

The fourth brake B4 that was operated at the sixth forward speed D6 is released and the first clutch C1 is operated at the seventh forward speed D7.

The first and second clutches C1 and C2 are operated simultaneously such that the rotation speed of the input shaft IS is input simultaneously to the third and fourth rotational members TM3 and TM4. Therefore, the first compound planetary gear set CPG1 becomes the direct-coupling state. Therefore, the first compound planetary gear set CPG1 forms the direct-coupling speed line T3 and outputs the rotation speed of the input shaft IS through the second rotational member TM2.

In a state that the rotation speed of the input shaft IS is input through the fifth rotational member TM5 directly connected to the second rotational member TM2, the rotation speed of the input shaft IS is input to the sixth rotational member TM6 by operation of the third clutch C3. Therefore, the second compound planetary gear set CPG2 becomes a direct-coupling state and forms a seventh shift line SP7.

Therefore, the seventh shift line SP7 crosses the vertical line of the seventh rotational member TM7 that is the output element such that the seventh forward speed D7 is output.

That is, a rotation speed that is the same as the rotation speed of the input shaft IS is output.

[Eighth Forward Speed]

The first clutch C1 that was operated at the seventh forward speed D7 is released and the second brake B2 is operated at the eighth forward speed D8.

In a state that the rotation speed of the input shaft IS is input to the third rotational member TM3 by operation of the second clutch C2, the first rotational member TM1 is operated as the fixed element by operation of the second brake B2 in the first compound planetary gear set CPG1.

Accordingly, the first compound planetary gear set CPG1 forms the second reduced speed line T2 and outputs the second reduced speed through the second rotational member TM2.

In a state that the second reduced speed is input to the fifth rotational member TM5 directly connected to the second rotational member TM2, the rotation speed of the input shaft IS is input to the sixth rotational member TM6 by operation of the third clutch C3. Therefore, the second compound planetary gear set CPG2 forms an eighth shift line SP8.

The eighth shift line SP8 crosses the vertical line of the seventh rotational member TM7 that is the output element such that the eighth forward speed D8 is output.

[Ninth Forward Speed]

The second clutch C2 that was operated at the eighth forward speed D8 is released and the first clutch C1 is operated at the ninth forward speed D9.

In a state that the rotation speed of the input shaft IS is input to the fourth rotational member TM4 by operation of the first clutch C1, the first rotational member TM1 is operated as the fixed element by operation of the second brake B2 in the first compound planetary gear set CPG1.

Therefore, the first compound planetary gear set CPG1 forms a first reduced speed line T1 and outputs a first reduced speed through the second rotational member TM2.

In a state that the first reduced speed is input to the fifth rotational member TM5 directly connected to the second rotational member TM2, the rotation speed of the input shaft IS is input to the sixth rotational member TM6 by operation of the third clutch C3. Therefore, the second compound planetary gear set CPG2 forms a ninth shift line SP9.

The ninth shift line SP9 crosses the vertical line of the seventh rotational member TM7 that is the output element such that the ninth forward speed D9 is output.

[Tenth Forward Speed]

The first clutch C1 that was operated at the ninth forward speed D9 is released and the first brake B1 is operated at the tenth forward speed D10.

The first compound planetary gear set CPG1 does not rotate by operations of the first brake B1 and the second brake B2, and forms a stopped speed line T5.

In a state that the fifth rotational member TM5 directly connected to the second rotational member TM2 is operated as the fixed element, the rotation speed of the input shaft IS is input to the sixth rotational member TM6 by operation of the third clutch C3. Therefore, the second compound planetary gear set CPG2 forms a tenth shift line SP10.

The tenth shift line SP10 crosses the vertical line of the seventh rotational member TM7 that is the output element such that the tenth forward speed D10 is output.

[Eleventh Forward Speed]

The second brake B2 that was operated at the tenth forward speed D10 is released and the first clutch C1 is operated at the eleventh forward speed D11.

In a state that the rotation speed of the input shaft IS is input to the fourth rotational member TM4 by operation of the first clutch C1, the third rotational member TM3 is operated as the fixed element by operation of the first brake B1 in the first compound planetary gear set CPG1.

The first compound planetary gear set CPG1 forms an inverse speed line T6 and outputs an inverse speed through the second rotational member TM2.

In a state that the inverse speed is input to the fifth rotational member TM5 directly connected to the second rotational member TM2, the rotation speed of the input shaft IS is input to the sixth rotational member TM6 by operation of the third clutch C3. Therefore, the second compound planetary gear set CPG2 forms an eleventh shift line SP11.

The eleventh shift line SP11 crosses the vertical line of the seventh rotational member TM7 that is the output element such that the eleventh forward speed D11 is output.

[Reverse Speed]

The first clutch C1 and the first and third brakes B1 and B3 are operated at the reverse speed REV.

In a state that the rotation speed of the input shaft IS is input to the fourth rotational member TM4 by operation of the first clutch C1, the third rotational member TM3 is operated as the fixed element by operation of the first brake B1 in the first compound planetary gear set CPG1.

The first compound planetary gear set CPG1 forms the inverse speed line T6 and outputs the inverse speed through the second rotational member TM2.

In a state that the inverse speed is input to the fifth rotational member TM5 directly connected to the second rotational member TM2, the eighth rotational member TM8 is operated as the fixed element by operation of the third brake B3. Therefore, the second compound planetary gear set CPG2 forms a reverse shift line SR.

The reverse shift line SR crosses the vertical line of the seventh rotational member TM7 that is the output element such that the reverse speed REV is output.

Four planetary gear sets PG1, PG2, PG3, and PG4 is combined to form two compound planetary gear sets CPG1 and CPG2 such that eleven forward speeds and one reverse speed is achieved by operation of three clutches C1, C2, and C3 and four brakes B1, B2, B3, and B4 according to the first exemplary embodiment of the present invention.

That is, the rotation speed of the input shaft IS is changed into six speed ratios and the six speed ratios are output from the first compound planetary gear set CPG1. In addition, the second compound planetary gear set CPG2 receives the six speed ratios from the first compound planetary gear set CPG1 and secondarily shifts the six speed ratios into the eleven forward speeds and one reverse speed.

Therefore, power delivery performance and fuel economy may be improved since the planetary gear train according to the first exemplary embodiment of the present invention can achieve multiple shift-speeds.

Since three friction members are operated at each shift-speed, the number of the friction members that are not operated can be reduced. Therefore, drag loss may be reduced and power delivery efficiency and fuel economy may be further improved.

Figure 4:
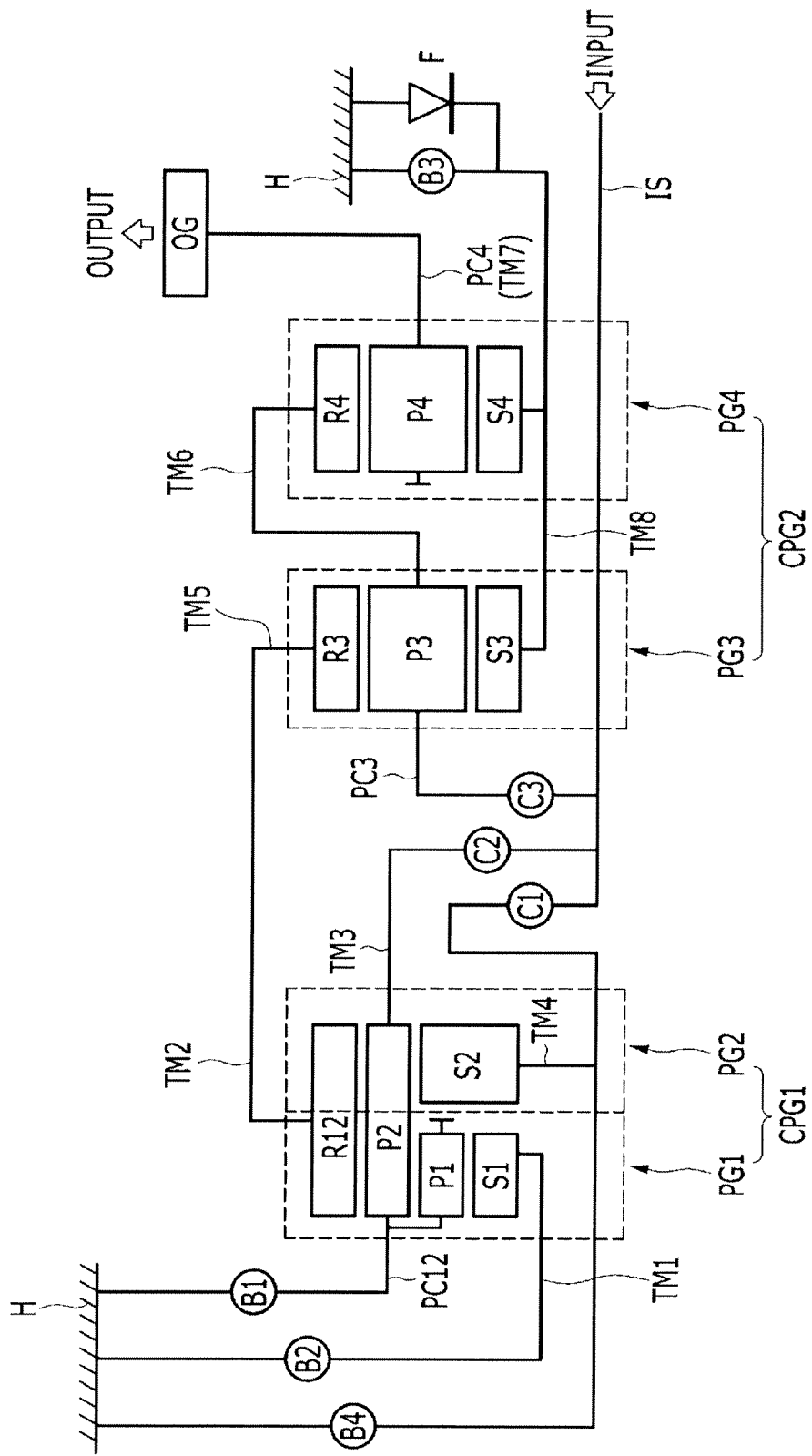
FIG. 4 is a schematic diagram of a planetary gear train according to the various exemplary embodiments of the present invention.

FIG. 4 is a schematic diagram of a planetary gear train according to the second exemplary embodiment of the present invention.

Referring to FIG. 4, the first compound planetary gear set CPG1 according to the second exemplary embodiment is formed by combining the first planetary gear set PG1 being a double pinion planetary gear set and the second planetary gear set PG2 being a single pinion planetary gear set.

That is, the first compound planetary gear set CPG1 is formed by combining the first planetary gear set PG1 being the double pinion planetary gear set and the second planetary gear set PG2 being the single pinion planetary gear set so as to be a compound planetary gear set of Ravingneaux type having a ring gear and a planet carrier in common.

Therefore, the compound planetary gear set CPG is operated by four rotation elements including a ring gear, a planet carrier, and two sun gears. For convenience of explanation, the ring gear is called a common ring gear R12, the planet carrier is called a common planet carrier PC12, the sun gear engaged with a short pinion P1 is called a first sun gear S1, and the sun gear engaged with a long pinion P2 is called a second sun gear S2.

The first compound planetary gear set CPG1 includes the first, second, third, and fourth rotational members TM1, TM2, TM3, and TM4.

The second compound planetary gear set CPG2, the same as the first exemplary embodiment, is formed by combining the third planetary gear set PG3 being the single pinion planetary gear set and the fourth planetary gear set PG4 being the single pinion planetary gear set.

The second compound planetary gear set CPG2 includes the fifth, sixth, seventh, and eighth rotational members TM5, TM6, TM7, and TM8 by connecting the third planet carrier PC3 with the fourth ring gear R4 and connecting the third sun gear S3 with the fourth sun gear S4.

Accordingly, the second exemplary embodiment includes eight rotational members TM1-TM8.

The first rotational member TM1 includes the first sun gear S1 and is adapted to be selectively connected to the transmission housing H.

The second rotational member TM2 includes the common ring gear R12.

The third rotational member TM3 includes the common planet carrier PC12 and is adapted to be selectively connected to the input shaft IS or to the transmission housing H.

The fourth rotational member TM4 includes the second sun gear S2 and is adapted to be selectively connected to the input shaft IS or to the transmission housing H.

The fifth rotational member TM5 includes the third ring gear R3 and is adapted to be directly connected to the second rotational member TM2.

The sixth rotational member TM6 includes the third planet carrier PC3 and the fourth ring gear R4 and is adapted to be selectively connected to the input shaft IS.

The seventh rotational member TM7 includes the fourth planet carrier PC4 and is adapted to be connected to the output gear OG.

The eighth rotational member TM8 includes the third sun gear S3 and the fourth sun gear S4 and is adapted to be selectively connected to the transmission housing H.

In addition, the third, fourth, and sixth rotational members TM3, TM4, and TM6 among the rotational members TM1-TM8 selectively connected to the input shaft IS and operated as selective input elements are connected to the input shaft IS respectively through the clutches C2, C1, and C3.

In addition, the first, third, fourth, and eighth rotational members TM1, TM3, TM4, and TM8 among the rotational members TM1-TM8 selectively connected to the transmission housing H and operated as selective fixed elements are connected to the transmission housing H respectively through the brakes B2, B1, B4, and B3.

That is, the first clutch C1 is interposed between the input shaft IS and the fourth rotational member TM4, and operates the fourth rotational member TM4 as the selective input element.

The second clutch C2 is interposed between the input shaft IS and the third rotational member TM3, and operates the third rotational member TM3 as the selective input element.

The third clutch C3 is interposed between the input shaft IS and the sixth rotational member TM6, and operates the sixth rotational member TM6 as the selective input element.

The first brake B1 is interposed between the third rotational member TM3 and the transmission housing H, and operates the third rotational member TM3 as the selective fixed element.

The second brake B2 is interposed between the first rotational member TM1 and the transmission housing H, and operates the first rotational member TM1 as the selective fixed element.

The third brake B3 is interposed between the eighth rotational member TM8 and the transmission housing H, and operates the eighth rotational member TM8 as the selective fixed element.

The fourth brake B4 is interposed between the fourth rotational member TM4 and the transmission housing H, and operates the fourth rotational member TM4 as the selective fixed element.

A one-way clutch F1 is further included between the eighth rotational member TM8 and transmission housing H. The one-way clutch F1 is disposed in parallel with the third brake B3.

The first compound planetary gear set CPG1 according to the second exemplary embodiment of the present invention is different from that of the first exemplary embodiment. In addition, the connections between the first compound planetary gear set CPG1 and the second compound planetary gear set CPG2 according to the second exemplary embodiment are different from those according to the first exemplary embodiment.

Therefore, eight rotational members of the second exemplary embodiment, as shown in FIG. 3 and FIG. 4, are different from those of the first exemplary embodiment. However, operation of the friction members at each shift-speed and shifting processes of the second exemplary embodiment are the same as those of the first exemplary embodiment. Therefore, detailed description will be omitted.

Since eleven forward speeds are achieved by combining four planetary gear sets being simple planetary gear sets with seven friction members, power delivery performance and fuel consumption may be improved according to exemplary embodiments of the present invention.

Since three friction members are operated at each shift-speed, the number of the friction members that are not operated can be reduced. Therefore, drag loss may be reduced and power delivery efficiency and fuel economy may be further improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
   an input shaft adapted to receive engine torque;
   an output gear adapted to output a shifted torque;
   a first compound planetary gear set having four rotation elements by combining first and second planetary gear sets and adapted to primarily shift torque input through two input paths into six speed ratio and to output the primarily shifted torque;
   a second compound planetary gear set having four rotation elements by combing third and fourth planetary gear sets and adapted to secondarily shift the torque input from the first compound planetary gear set and the torque input from the input shaft through one path into multiple shift-speeds and to output the multiple shift-speeds;
   eight rotational members including two rotation elements connected to each other or one rotation element among the rotation elements of the first and second compound planetary gear sets; and
   seven friction members including three clutches interposed between a selected rotational member among the rotational members and the input shaft and adapted to selectively transmit the torque and four brakes interposed between a selected rotational member among the rotational members and a transmission housing;
   wherein the second compound planetary gear set comprises:
   the third planetary gear set being a single pinion planetary gear set having a third sun gear, a third planet carrier, and a third ring gear;
   the fourth planetary gear set being a single pinion planetary gear set having a fourth sun gear, a fourth planet carrier, and a fourth ring gear;
   a fifth rotational member including the fourth sun gear and adapted to be directly connected to the first planet carrier and the second ring gear of the first compound planetary gear set;
   a sixth rotational member including the third ring gear and the fourth planet carrier and adapted to be selectively connected to the input shaft;
   a seventh rotational member including the third planet carrier and the fourth ring gear and adapted to be directly connected to the output gear;
   an eighth rotational member including the third sun gear and adapted to be selectively connected to the transmission housing;
   a third clutch interposed between the input shaft and the sixth rotational member;
   a third brake interposed between the eighth rotational member and the transmission housing.

2. The planetary gear train of claim 1, wherein the first compound planetary gear set comprises:
- the first planetary gear set being a single pinion planetary gear set having a first sun gear, a first planet carrier, and a first ring gear;
- the second planetary gear set being a single pinion planetary gear set having a second sun gear, a second planet carrier, and a second ring gear;
- a first rotational member including the first sun gear and adapted to be connected to the transmission housing selectively;
- a second rotational member including the first planet carrier and the second ring gear;
- a third rotational member including the first ring gear and the second planet carrier, and adapted to be selectively connected to the input shaft or to the transmission housing;
- a fourth rotational member including the second sun gear and adapted to be selectively connected to the input shaft or to the transmission housing;
- a first clutch interposed between the input shaft and the fourth rotational member;
- a second clutch interposed between the input shaft and the third rotational member;
- a first brake interposed between the third rotational member and the transmission housing;
- a second brake interposed between the first rotational member and the transmission housing; and
- a fourth brake interposed between the fourth rotational member and the transmission housing.

3. The planetary gear train of claim 1, wherein the multiple shift-speeds comprises:
- a first forward speed achieved by operating a first clutch, a second brake, and a third brake;
- a second forward speed achieved by operating a second clutch, the second brake, and the third brake;
- a third forward speed achieved by operating the first clutch, the second clutch, and the third brake;
- a fourth forward speed achieved by operating the second clutch, the third brake, and a fourth brake;
- a fifth forward speed achieved by operating the second clutch, a third clutch, and the third brake;
- a sixth forward speed achieved by operating the second clutch, the third clutch, and the fourth brake;
- a seventh forward speed achieved by operating the first clutch, the second clutch, and the third clutch;
- an eighth forward speed achieved by operating the second clutch, the third clutch, and the second brake;
- a ninth forward speed achieved by operating the first clutch, the third clutch, and the second brake;
- a tenth forward speed achieved by operating the third clutch, a first brake, and the second brake;
- an eleventh forward speed achieved by operating the first clutch, the third clutch, and the first brake; and
- a reverse speed achieved by operating the first clutch, the first brake, and the third brake.

4. A planetary gear train of an automatic transmission for vehicles, comprising:
- an input shaft adapted to receive engine torque;
- an output gear adapted to output a shifted torque;
- a first compound planetary gear set having four rotation elements by combining first and second planetary gear sets and adapted to primarily shift torque input through two input paths into six speed ratio and to output the primarily shifted torque;
- a second compound planetary gear set having four rotation elements by combing third and fourth planetary gear sets and adapted to secondarily shift the torque input from the first compound planetary gear set and the torque input from the input shaft through one path into multiple shift-speeds and to output the multiple shift-speeds;
- eight rotational members including two rotation elements connected to each other or one rotation element among the rotation elements of the first and second compound planetary gear sets; and
- seven friction members including three clutches interposed between a selected rotational member among the rotational members and the input shaft and adapted to selectively transmit the torque and four brakes interposed between a selected rotational member among the rotational members and a transmission housing;

wherein the second compound planetary gear set comprises:
- the third planetary gear set being a single pinion planetary gear set having a third sun gear, a third planet carrier, and a third ring gear;
- the fourth planetary gear set being a single pinion planetary gear set having a fourth sun gear, a fourth planet carrier, and a fourth ring gear;
- a fifth rotational member including the third ring gear and adapted to be directly connected to a common ring gear of the first compound planetary gear set;
- a sixth rotational member including the third planet carrier and the fourth ring gear and adapted to be selectively connected to the input shaft;
- a seventh rotational member including the fourth planet carrier and adapted to be directly connected to the output gear;
- an eighth rotational member including the third sun gear and the fourth sun gear and adapted to be selectively connected to the transmission housing;
- a third clutch interposed between the input shaft and the sixth rotational member; and a third brake interposed between the eighth rotational member and the transmission housing.

5. The planetary gear train of claim 4, wherein the first compound planetary gear set is a compound planetary gear set of Ravingneaux type formed by combining the first planetary gear set being a double pinion planetary gear set and the second planetary gear set being a single pinion planetary gear set and by sharing a ring gear and a planet carrier in common, and includes a first sun gear engaged with a short pinion, a second sun gear engaged with a long pinion, a common planet carrier, and a common ring gear, and wherein the first compound planetary gear set comprises:
- a first rotational member including the first sun gear and adapted to be selectively connected to the transmission housing;
- a second rotational member including the common ring gear;
- a third rotational member including the common planet carrier and adapted to be selectively connected to the input shaft or to the transmission housing;
- a fourth rotational member including the second sun gear and adapted to be selectively connected to the input shaft or to the transmission housing;
- a first clutch interposed between the input shaft and the fourth rotational member;
- a second clutch interposed between the input shaft and the third rotational member;
- a first brake interposed between the third rotational member and the transmission housing;
- a second brake interposed between the first rotational member and the transmission housing; and a fourth brake interposed between the fourth rotational member and the transmission housing.

6. The planetary gear train of claim 4, further comprising a one-way clutch disposed in parallel with the third brake.

7. A planetary gear train of an automatic transmission for vehicles realizing multiple shift-speeds, comprising:
an input shaft adapted to receive engine torque;
an output gear adapted to output a shifted torque;
a first compound planetary gear set formed by combining a first planetary gear set having a first sun gear, a first planet carrier, and a first ring gear as rotation elements thereof and a second planetary gear set having a second sun gear, a second planet carrier, and a second ring gear as rotation elements thereof;
a second compound planetary gear set formed by combining a third planetary gear set having a third sun gear, a third planet carrier, and a third ring gear as rotation elements thereof and a fourth planetary gear set having a fourth sun gear, a fourth planet carrier, and a fourth ring gear as rotation elements thereof;
a first rotational member including the first sun gear and adapted to be selectively connected to a transmission housing;
a second rotational member including the first planet carrier and the second ring gear;
a third rotational member including the first ring gear and the second planet carrier and adapted to be selectively connected to the input shaft or to the transmission housing;
a fourth rotational member including the second sun gear and adapted to be selectively connected to the input shaft or to the transmission housing;
a fifth rotational member including the fourth sun gear and adapted to be directly connected to the first planet carrier and the second ring gear of the first compound planetary gear set;
a sixth rotational member including the third ring gear and the fourth planet carrier and adapted to be selectively connected to the input shaft;
a seventh rotational member including the third planet carrier and the fourth ring gear and adapted to be directly connected to an output gear;
an eighth rotational member including the third sun gear and adapted to be selectively connected to the transmission housing; and
seven friction members including clutches interposed between selected rotational members among the eight rotational members or between a selected rotational member and the input shaft and brakes interposed between a selected rotational member among the rotational members and the transmission housing.

8. The planetary gear train of claim 7, wherein each of the first, second, third, and fourth planetary gear sets is a single pinion planetary gear set.

9. The planetary gear train of claim 7, wherein the seven friction members include:
a first clutch interposed between the input shaft and the fourth rotational member;
a second clutch interposed between the input shaft and the third rotational member;
a third clutch interposed between the input shaft and the sixth rotational member;
a first brake interposed between the third rotational member and the transmission housing;
a second brake interposed between the first rotational member and the transmission housing;
a third brake interposed between the eighth rotational member and the transmission housing; and
a fourth brake interposed between the fourth rotational member and the transmission housing.

10. The planetary gear train of claim 9, wherein the multiple shift-speeds comprises:
a first forward speed achieved by operating the first clutch, the second brake, and the third brake;
a second forward speed achieved by operating the second clutch, the second brake, and the third brake;
a third forward speed achieved by operating the first clutch, the second clutch, and the third brake;
a fourth forward speed achieved by operating the second clutch, the third brake, and the fourth brake;
a fifth forward speed achieved by operating the second clutch, the third clutch, and the third brake;
a sixth forward speed achieved by operating the second clutch, the third clutch, and the fourth brake;
a seventh forward speed achieved by operating the first clutch, the second clutch, and the third clutch;
an eighth forward speed achieved by operating the second clutch, the third clutch, and the second brake;
a ninth forward speed achieved by operating the first clutch, the third clutch, and the second brake;
a tenth forward speed achieved by operating the third clutch, the first brake, and the second brake;
an eleventh forward speed achieved by operating the first clutch, the third clutch, and the first brake; and
a reverse speed achieved by operating the first clutch, the first brake, and the third brake.

11. A planetary gear train of an automatic transmission for vehicles realizing multiple shift-speeds, comprising:
an input shaft adapted to receive engine torque;
an output gear adapted to output a shifted torque;
a first compound planetary gear set being a compound planetary gear set of Ravingneaux type having a first sun gear engaged with a short pinion, a second sun gear engaged with a long pinion, a common planet carrier, and a common ring gear;
a second compound planetary gear set formed by combining a third planetary gear set having a third sun gear, a third planet carrier, and a third ring gear as rotation elements thereof and a fourth planetary gear set having a fourth sun gear, a fourth planet carrier, and a fourth ring gear as rotation elements thereof;
a first rotational member including the first sun gear and adapted to be selectively connected to a transmission housing;
a second rotational member including the common ring gear;
a third rotational member including the common planet carrier and adapted to be selectively connected to the input shaft or to the transmission housing;
a fourth rotational member including the second sun gear and adapted to be selectively connected to the input shaft or to the transmission housing;
a fifth rotational member including the third ring gear and adapted to be directly connected to the common ring gear of the first compound planetary gear set;
a sixth rotational member including the third planet carrier and the fourth ring gear and adapted to be selectively connected to the input shaft;
a seventh rotational member including the fourth planet carrier and adapted to be directly connected to an output gear;

an eighth rotational member including the third sun gear and the fourth sun gear and adapted to be selectively connected to the transmission housing; and seven friction members including clutches interposed between selected rotational members among the eight rotational members or between a selected rotational member and the input shaft and brakes interposed between a selected rotational member among the rotational members and the transmission housing.

12. The planetary gear train of claim 11, wherein the third and fourth planetary gear sets forming the second compound planetary gear set are single pinion planetary gear sets.

13. The planetary gear train of claim 11, wherein the seven friction members include:
- a first clutch interposed between the input shaft and the fourth rotational member;
- a second clutch interposed between the input shaft and the third rotational member;
- a third clutch interposed between the input shaft and the sixth rotational member;
- a first brake interposed between the third rotational member and the transmission housing;
- a second brake interposed between the first rotational member and the transmission housing;
- a third brake interposed between the eighth rotational member and the transmission housing; and
- a fourth brake interposed between the fourth rotational member and the transmission housing.

14. The planetary gear train of claim 13, wherein the multiple shift-speeds comprises:
- a first forward speed achieved by operating the first clutch, the second brake, and the third brake;
- a second forward speed achieved by operating the second clutch, the second brake, and the third brake;
- a third forward speed achieved by operating the first clutch, the second clutch, and the third brake;
- a fourth forward speed achieved by operating the second clutch, the third brake, and the fourth brake;
- a fifth forward speed achieved by operating the second clutch, the third clutch, and the third brake;
- a sixth forward speed achieved by operating the second clutch, the third clutch, and the fourth brake;
- a seventh forward speed achieved by operating the first clutch, the second clutch, and the third clutch;
- an eighth forward speed achieved by operating the second clutch, the third clutch, and the second brake;
- a ninth forward speed achieved by operating the first clutch, the third clutch, and the second brake;
- a tenth forward speed achieved by operating the third clutch, the first brake, and the second brake;
- an eleventh forward speed achieved by operating the first clutch, the third clutch, and the first brake; and
- a reverse speed achieved by operating the first clutch, the first brake, and the third brake.

* * * * *